United States Patent [19]
Van Luyn

[11] 3,731,295
[45] May 1, 1973

[54] LEAK DETECTOR FOR ENCLOSED ELECTRICAL APPARATUS

[75] Inventor: Robert Van Luyn, Rome, Ga.

[73] Assignee: General Electric Company

[22] Filed: Mar. 17, 1971

[21] Appl. No.: 125,121

[52] U.S. Cl.................340/242, 73/49.3, 174/11 R, 200/83 R, 317/14 J
[51] Int. Cl.............................................G08b 21/00
[58] Field of Search..................340/38 L, 240, 242; 200/83 R, 83 D; 320/54, 61, 33, 6; 317/141 R, 14 G, 14 H, 14 J; 174/11 R; 73/49.2, 49.3; 338/41

[56] References Cited

UNITED STATES PATENTS

| 2,182,637 | 12/1939 | Marbury | 317/141 R |
| 3,171,065 | 2/1965 | King et al. | 317/141 R |
| 3,356,922 | 12/1967 | Johnston | 320/54 X |
| 2,553,291 | 5/1951 | Barr | 200/83 D |
| 3,365,710 | 1/1968 | Duplessy | 340/242 |
| 3,233,234 | 2/1966 | Stelmach | 340/38 L |

FOREIGN PATENTS OR APPLICATIONS

| 709,436 | 8/1931 | France | 340/240 |

Primary Examiner—John W. Caldwell
Assistant Examiner—Daniel Myer
Attorney—Francis X. Doyle, Frank L. Neuhauser, Oscar B. Waddell and Joseph B. Forman

[57] ABSTRACT

A detector for sensing the presence of a leak in a sealed, fluid-filled enclosure for electrical apparatus. The detector includes means for determining when the pressure within the enclosure is substantially equal to the pressure without the enclosure. When such a condition has existed for a preselected time period a warning device is actuated to indicate the existence of a leak in the enclosure.

5 Claims, 1 Drawing Figure

Patented May 1, 1973
3,731,295
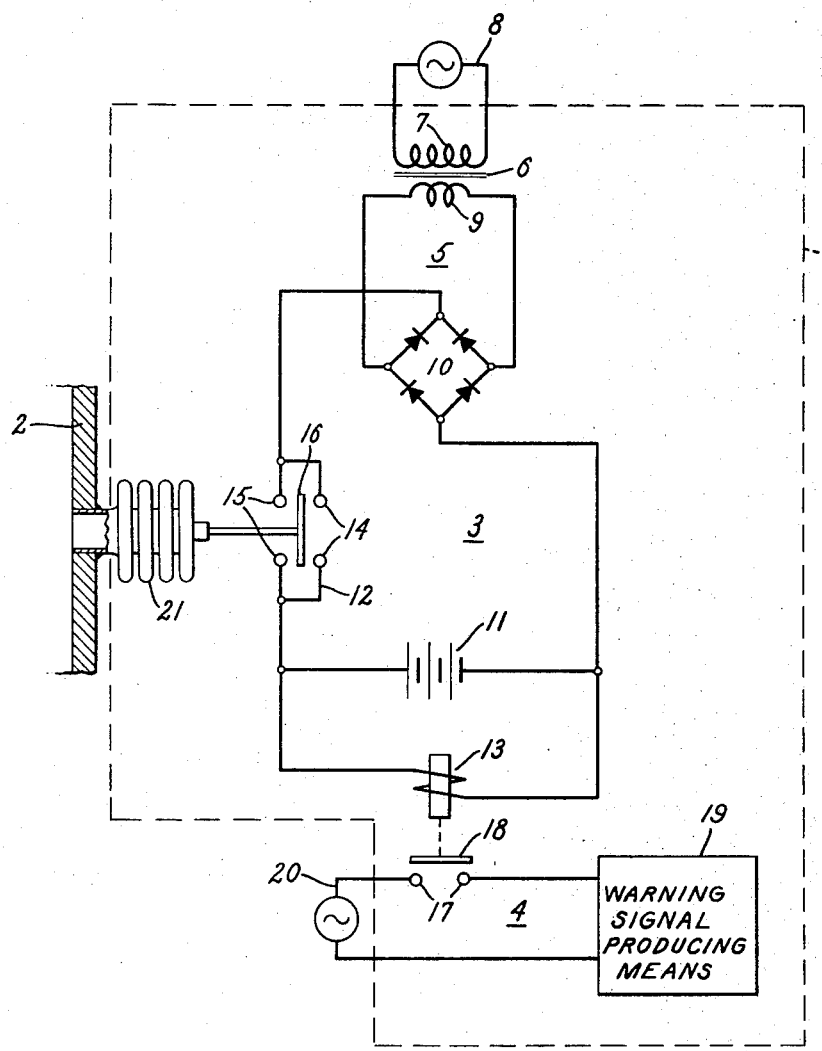
INVENTOR:
ROBERT VAN LUYN,
BY Barry A. Stein
ATTORNEY

LEAK DETECTOR FOR ENCLOSED ELECTRICAL APPARATUS

BACKGROUND AND OBJECTS OF THE INVENTION

This invention relates to protective equipment for enclosed electric power apparatus, and more particularly it relates to leak detectors for sealed enclosures containing electrical apparatus immersed in a body of dielectric fluid.

In the art of power transmission and distribution it is a common practice to employ electrical apparatus enclosed in a sealed tank containing dielectric fluid, as for example fluid immersed power transformers, reactors, switchgear or the like.

Fluid immersed electrical apparatus of the sealed tank type is commonly filled or partially filled with an insulating gas or liquid. In this liquid filled apparatus a gas space is usually provided above the liquid surface to serve as an expansion space for the liquid. This space is usually filled with a neutral gas such as nitrogen or air.

During the operational period when a liquid-filled transformer is supplying substantial load current, the liquid surrounding its coils will be heated by the passage of current and will expand appreciably. Conversely, during a period of light loading the dielectric fluid will be enabled to cool and thus contract. In most cases the high loading period on a transformer occurs during the day and the low loading period occurs during the evening. In any event, when the dielectric liquid is heated up as a result of a large imposed load, the pressure within the transformer tank will increase above atmospheric pressure (such increased pressure will be hereinafter denoted as "positive pressure"). When the dielectric fluid cools down the pressure within the tank will drop below atmospheric pressure (such decreased pressure will hereinafter be denoted as "negative pressure").

If there is a leak in the transformer tank, the pressure within the tank will be approximately equal to the pressure outside the tank although a slight pressure differential will exist. The magnitude of this pressure differential is a function of the magnitude of the transformer load and of the size of the leak in the tank (e.g., the smaller the tank leak, the greater the pressure differential for a given difference in load magnitude). Accordingly, if a leak exists, during the periods that the transformer is supplying a large load, only a slight positive pressure will build up in the tank. Nevertheless, even the slight positive pressure will result in the expulsion of some of the neutral gas contained in the tank. During periods that the transformer is supplying a small load the pressure in the tank will be slightly negative and some cool, moist, outside air will be drawn into the tank. Over a long period of time, e.g., several weeks or months, the recurring slight pressure changes inside the tank will enable a sufficient amount of water vapor to enter the tank and to accumulate therein to impair the operational capability of the transformer by degrading the dielectric fluid and the solid electrical insulation.

Merely detecting when the pressure within the transformer tank is equal to the ambient pressure outside the tank, as a number of prior art leak detectors do, is not a reliable indication of the existence of a tank leak since such a condition will naturally occur, even absent a leak, between periods of high and low transformer loading as the dielectric fluid is either heated or cooled.

Accordingly, it is a general object of my invention to provide means for reliably detecting the presence of a leak in a sealed enclosure, dielectric-fluid-filled, electrical apparatus.

It is a further object of my invention to provide means for reliably detecting the presence of a leak in a sealed enclosure, dielectric-fluid-filled, electrical apparatus and for providing a warning signal indicative of such a condition.

SUMMARY OF THE INVENTION

In carrying out my invention in one form, I provide a detector for determining the presence of a leak in sealed enclosure, dielectric-fluid-filled, electrical apparatus and for providing a warning signal indicative of such a condition. My detector operates by monitoring the pressure within the apparatus enclosure. If the pressure within the enclosure is substantially equal to the pressure outside the enclosure for a predetermined period of time, a warning signal is provided to indicate the existence of a leak in the apparatus enclosure.

The detector comprises movable means which responds to the pressure existing within the enclosure. The movable means is coupled to a dischargeable energy storage means and to an energy source. Means are provided, coupled to the movable means, to enable the energy source to supply energy to the energy storage means except when the pressure within the enclosure is substantially equal to the pressure outside the enclosure. Signal warning means are provided coupled to the energy storage means. The signal warning means provides a warning indication whenever the energy storage means has discharged below a preselected level.

BRIEF DESCRIPTION OF THE DRAWING

My invention will be better understood and its various objects and advantages will be more fully appreciated from the following description taken in conjunction with the accompanying drawing which is a schematic diagram of my leak detector.

DETAILED DESCRIPTION OF THE PREFERRED EMBODIMENTS

As can be seen in the drawing a leak detector 1, in accordance with my invention, is shown coupled to the enclosure or tank 2 of a transformer. The transformer tank is sealed and houses the transformer coils (not shown), which are immersed in a dielectric liquid (not shown), such as oil, to provide the necessary electrical insulation therefor. The leak detector functions to provide a warning signal upon the detection of the leak in the tank.

As was previously noted the pressure within the sealed tank of a fluid filled transformer will vary depending upon the magnitude of the load being supplied. Absent a leak in the tank, during periods of high loading there will be a positive pressure within the tank, while during periods of low loading a negative pressure will exist. Accordingly, during the transition from a low load period to a high load period or vice versa there will be a time when the pressure in the tank is within a narrow pressure range between slightly positive pressure and slightly negative pressure. This condition, hereinafter referred to as a "substantial pressure balance," also exists when there is a leak in the transformer tank. It follows then, that the mere determination of the existence of a "substantial pressure balance" is not a sufficiently reliable indication of the presence of a tank leak since such a balance may be merely transitional rather than leak representative.

My leak detector does more than merely detect the presence of a "substantial pressure balance" and in so doing is capable of reliably determining the existence of a leak in the transformer tank. I have found that if the pressure within the tank stays within the narrow pressure range between slightly positive pressure (e.g., plus 10 mm of mercury) and slightly negative pressure (e.g., minus 10 mm of mercury) for a relatively long period of time (e.g., 24 hours) this is indicative of the existence of a leak in the transformer tank. Therefore, I have designed detector 1 to be unresponsive to short duration "substantial pressure balances" (e.g., transitional pressure balances) but to respond to relatively long duration (e.g., 24 hours) balances and to provide a warning signal indicative of the existence thereof.

Detector 1 comprises a detection circuit 3 and a warning circuit 4.

The function of the detection circuit is to detect when the pressure within the transformer tank 2 is substantially equal to the pressure outside the transformer tank and to actuate the warning circuit 4 if that pressure condition exists for a predetermined time period. When I say that the pressure within the tank is substantially equal to the pressure outside the tank I mean that the pressure within the tank is within a narrow range between slightly positive pressure and slightly negative pressure. This condition has been previously referred to as a "substantial pressure balance."

The function of the warning circuit is to provide a leak warning signal upon being actuated.

The detection circuit comprises a source of electrical energy 5 which includes a transformer 6 whose primary 7 is coupled to an A-C power line 8 and whose secondary 9 is coupled to a full wave diode rectifier bridge, 10. The detection circuit comprises an energy storage device 11, a switch means 12 and a warning circuit actuating relay 13. The switch means is connected between the energy source 5 and both the storage device 11 and the relay 13. The switch means includes two pairs of stationary contacts, 14 and 15, and a movable contact 16.

When the movable contact of switch 12 bridges either pair of stationary contacts, the power source 5 is connected to the energy storage device 11 and to the relay 13. This results in the energization of the relay. The relay may also be energized from the energy storage device 11 itself, since that device comprises a rechargeable battery (which is preferably of the nickel-cadmium type). The battery is adapted to energize the relay whenever both pairs of contacts of the switch means 12 are open (assuming of course, that the battery is in a charged condition).

The relay is arranged such that whenever it becomes deenergized the warning circuit 4 is actuated to produce a leak warning signal. To that end, relay 13 includes a pair of stationary contacts 17 and a movable contact 18. The latter contact serves to close the stationary contacts whenever the relay is deenergized.

The warning circuit 4 includes a warning signal producing means 19 connected to an A-C line 20 via stationary contacts 17. The signal producing means may include either a visual signal producer or an audible signal producer, or a combination of both which, upon closure of contacts 17, produces a warning signal indicative of the existence of a transformer tank leak.

Movable means 21 are provided in my detector to effectuate the movement of the movable contact 16 of switch 12. Preferably such movable means comprises a bellows connected to movable contact 16. The bellows is also connected to the transformer tank in a manner such that its interior communicates with the interior of the tank. When arranged in this manner the bellows expands in the presence of positive tank pressure and in so doing causes the closure of contacts 14 by contact 16. In the presence of negative tank pressure the bellows contracts and in so doing causes the closure of contacts 15 by contact 16. When there is a "substantial pressure balance" in the tank the bellows moves contact 16 to a neutral position whereupon both pairs of contacts 14 and 15 remain open.

Operation of my leak detector will be better understood from the following examples. First it shall be assumed that transformer tank 2 does not have a leak in it and that the transformer is supplying a small load, having just previously supplied a large load. During the period that the transformer had supplied a large load positive pressure would have built up in the tank. Such pressure causes the bellows 21 to expand and results in the closure of contacts 14. Closure of contacts 14 enables the power source 5 to energize the relay 13 and to charge the battery 11 (if it had been previously discharged). The energization of relay 13 enables the stationary contacts 17 to remain open and the warning circuit 4 to be deactuated.

As the dielectric fluid inside the transformer tank cools (a result of the decreased load imposed on the transformer) the pressure within the tank decreases toward negative pressure. By the time that the pressure in the tank equals the pressure outside the tank, i.e., atmospheric pressure, the bellows will have contracted sufficiently to move the movable contact 16 to a neutral position and both pairs of stationary contacts 14 and 15 will be open. When this occurs energy source 5 will cease energizing relay 13. Nevertheless, the relay will remain energized since the battery will begin to discharge its energy through the relay. The relay will remain energized for as long as the battery can provide sufficient relay energizing current. Therefore the battery utilized in my detector is selected to provide relay energizing current for a period of time which is greater than the time period during which a transitional "substantial pressure balance" would exist.

After the short endurance period of the transitional "substantial pressure balance" the pressure within the tank will decrease further, whereupon the bellows will contract further and cause the closure of contacts 15. At this time the energy source 5 will take over the energization of the relay 13 and will also begin recharging the battery 11.

It should therefore be appreciated from the above example that a transitional "substantial pressure balance" does not cause the erroneous production of a leak warning signal.

Now it shall be assumed that a leak arises in the tank at a time when there is a positive pressure therein. In such an event the pressure would decrease until it is within the narrow "substantial pressure balance" range. This results in the bellows moving movable contact 16 to the neutral position whereupon source 5 will cease energizing relay 13 and battery 11 will begin energizing relay 13. Owing to the existence of the leak, the pressure within the tank will remain in that narrow range for as long as the leak exists, irrespective of changes in the magnitude of the load. Accordingly, if the leak is still in existence at the time that the battery has discharged to the point where the amount of energy remaining in it is insufficient to provide relay energizing current, the relay will be deenergized. Upon the deenergization of relay 13, movable contact 18 will close stationary contacts 17, thereby actuating the warning circuit and producing a signal indicative of the existence of the leak.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A leak detector for determining when the pressure within a closed, fluid containing enclosure is substantially equal to the pressure without said enclosure, and for providing a warning signal when such a condition has existed for a preselected period of time, said detector comprising:
   a. movable means responsive to the pressure within the enclosure;
   b. dischargeable energy storage means;
   c. first means coupled to said movable means for energizing said energy storage means except when the pressure within the enclosure is substantially equal to the pressure without the enclosure; and
   d. means adapted for providing a warning signal in response to the discharge of said energy storage means.

2. The leak detector as specified in claim 1 wherein said energy storage means includes a storage battery and wherein said signal producing means is responsive to the discharge of a predetermined portion of the energy stored by said battery.

3. The leak detector as specified in claim 2 wherein said movable means includes a bellows and wherein said first means comprises a switch means connected to said bellows and a source of energy, said source of energy being connected to said battery via said switch means.

4. A leak detector for determining when the pressure within a sealed transformer tank containing a dielectric liquid is substantially equal to the pressure without said tank and for providing a warning signal when such a condition has existed for a preselected period of time, said detector comprising:
   a. movable means responsive to the pressure within the tank;
   b. dischargeable energy storage means;
   c. energy supply means coupled to said energy storage means;
   d. switch means coupled to said movable means connecting said energy supply means to energize said energy storage means except when the pressure within the tank is substantially equal to the pressure without the tank; and
   e. means for providing a warning signal in response to the discharge of a preselected amount of energy stored in said storage means.

5. In an electric translating apparatus coupled to an electric load, said apparatus being housed within a sealed tank containing a dielectric fluid, the magnitude of the pressure within the tank being variable in response to changes in the magnitude of said load, a leak detector coupled to said tank for determining when the pressure within the tank is substantially equal to the pressure without said tank and for providing a warning signal when such a condition has existed for a preselected period of time, said detector comprising:
   a. movable means responsive to the pressure with the tank;
   b. dischargeable energy storage means;
   c. energy supply means coupled to said energy storage means;
   d. switch means coupled to said movable means connecting said energy supply means to energize said energy storage means except when the pressure within the tank is substantially equal to the pressure without the tank; and
   e. means for providing a warning signal in response to the discharge of a preselected amount of energy stored in said storage means.

* * * * *